(12) United States Patent
Ando

(10) Patent No.: US 6,895,555 B1
(45) Date of Patent: May 17, 2005

(54) IMAGE PROCESSING APPARATUS, METHOD, AND STORAGE MEDIUM FOR CONTROLLING DISPLAY OF COPYRIGHT-PROTECTED INFORMATION

(75) Inventor: Tsutomu Ando, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/450,679

(22) Filed: Nov. 30, 1999

(30) Foreign Application Priority Data

Dec. 3, 1998 (JP) .......................................... 10-344215

(51) Int. Cl.$^7$ ................................................ G06F 3/00
(52) U.S. Cl. ...................... 715/719; 715/716; 715/848; 715/852
(58) Field of Search ................................ 345/716, 719, 345/764, 836, 848, 852, 835, 849, 419, 741, 742, 760, 738; 707/500.1

(56) References Cited

U.S. PATENT DOCUMENTS

| | | | |
|---|---|---|---|
| 5,530,759 A | * 6/1996 | Braudaway et al. | 380/54 |
| 5,991,500 A | * 11/1999 | Kanota | 386/94 |
| 6,198,875 B1 | * 3/2001 | Edenson et al. | 386/94 |
| 6,236,727 B1 | * 5/2001 | Ciacelli et al. | 380/212 |
| 6,343,283 B1 | * 1/2002 | Saito et al. | 705/57 |

FOREIGN PATENT DOCUMENTS

| | | |
|---|---|---|
| EP | 0 715 246 A1 | 6/1996 |
| EP | 0 969 668 A2 | 1/2000 |
| WO | WO 99/48296 | 9/1999 |

OTHER PUBLICATIONS

"MPEG–4 IPR Protection Requirements Specifications". Hill, et al., Acts Project AC301—Mirador, pps. 1–50, Jul. 1998.

"MPEG–4 Systems, Concepts and Implementation", Franco Casalino, et al., Lecture Notes in Computer Science, pps. 504–517, May 26, 1998.

"N–2323—MPEG–4 Overview—(Dublin version)", Rob Koenen, International Organization for Standardization—Organisation Internationale De Normalisation, pps. 1–55, Jul. 1998.

"The MPEG–4 System and Description Languages: From Practice to Theory", Alexandros Eleftheriadis, IEEE International Symposium on Circuits and Systems, pps. 1480–1483, Jun. 9, 1997.

* cited by examiner

*Primary Examiner*—Raymond J. Bayerl
*Assistant Examiner*—Kieu D. Vu
(74) *Attorney, Agent, or Firm*—Fitzpatrick, Cella, Harper & Scinto

(57) ABSTRACT

An image processing apparatus is constructed by: a receiving unit for receiving scene data describing a 3-dimensional scene, media data associated with the scene data, and copyright-protected data; a scene decoder for forming copyright-protected scene data and copyright-unprotected scene data from the scene data on the basis of the copyright-protected data; and a renderer for rendering the 3-dimensional scene on the basis of the media data, the copyright-protected scene data, and the copyright-unprotected scene data.

22 Claims, 9 Drawing Sheets

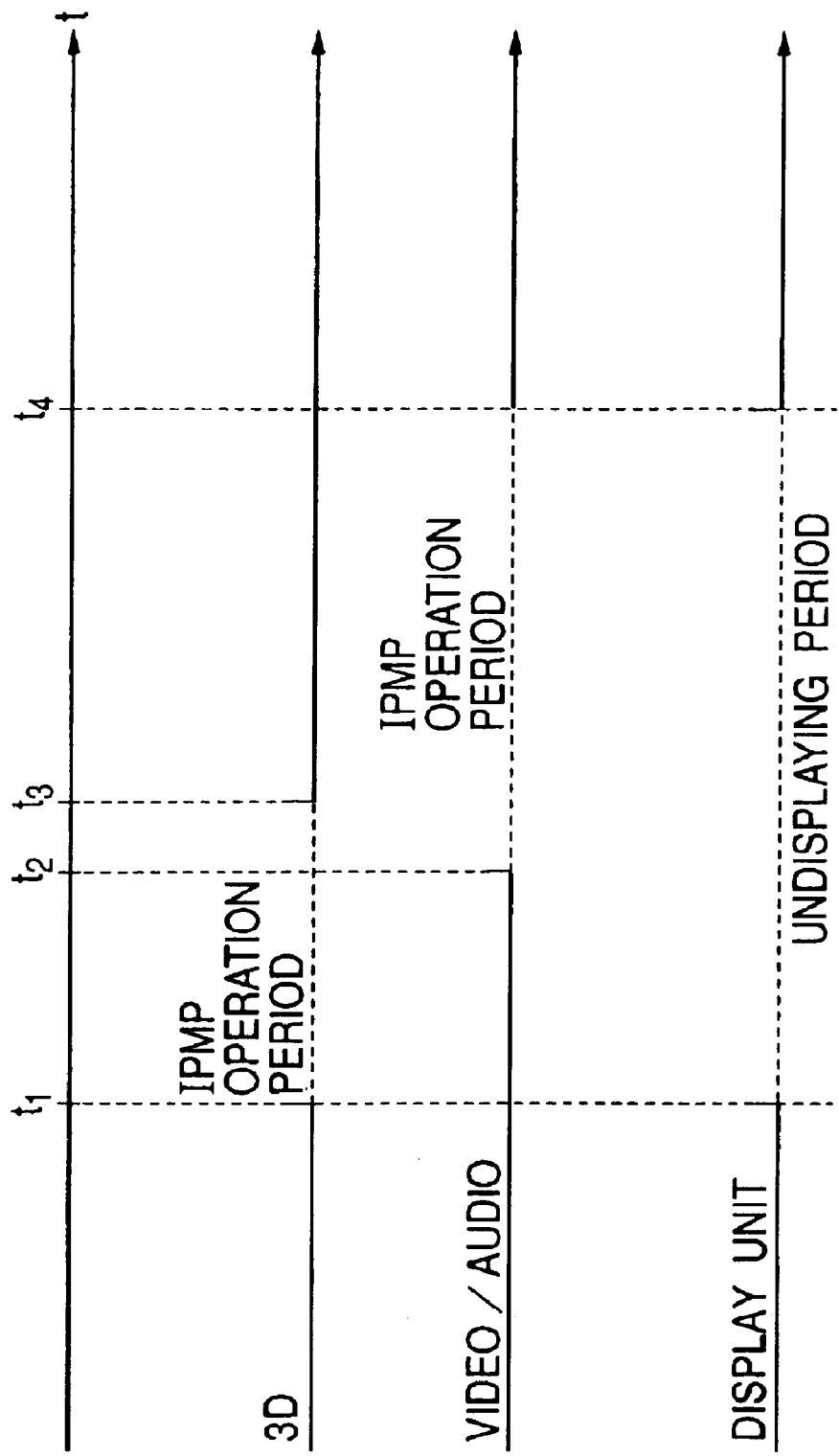

FIG. 12

```
Transform {                                              1
  translation -0.926123 1.49168 -0.0233803               2
  rotation 0 1 0 0                                       3
  children {                                             4
    Transform {                                          5
      translation 0 0 -0.976271                          6
      children [                                         7
        Shape {                                          8
          geometry Box { 1 1 1 }                         9
          appearance Appearance {                        10
            material Material {}                         11
            texture ImageTexture {                       12
              url a1 Texture1.jpg a1                     13
            }                                            14
          }                                              15
        }                                                16
      ]                                                  17
    }                                                    18
    Transform {                                          19
      translation 2.26053 -0.0278533 0.867797            20
      rotation 0 1 0 0                                   21
      children [                                         22
        Shape {                                          23
          Protect {                                      24-1
            geometry Cylinder {}                         24-2
              url a1 IPMP1.dat a1                        24-3
          }                                              24-4
          appearance Appearance {                        25
            material Material {}                         26
            texture MovieTexture {                       27
              url a1 Texture2.mpg a1                     28
            }                                            29
          }                                              30
        }                                                31
      ]                                                  32
    }                                                    33
  ]                                                      34
}                                                        35
Protect {                                                35-1
  url a1 IPMP1.dat a1                                    35-2
  Sound {                                                36
    source AudioClip {                                   37
      url a1 Sound.mpg a1                                38
    }                                                    39
  }                                                      40
```

IMAGE PROCESSING APPARATUS, METHOD, AND STORAGE MEDIUM FOR CONTROLLING DISPLAY OF COPYRIGHT-PROTECTED INFORMATION

BACKGROUND OF THE INVENTION

1. Field of the Invention

The invention relates to an image processing apparatus, method, and system and a storage medium, in which a copyright can be protected.

2. Related Background Art

Hitherto, a VRML (Virtual Reality Markup Language) is widely and generally used as a language to describe a 3D (three dimension) scene. In a system using such a language, an arbitrary object is arranged in a 3D space, a sight point, a light source, a texture map, and the like are set to thereby construct a scene, and a virtual space with high realism can be formed by adding data such as video/audio data to each object.

In ISO/IEC 14494-1 (MPEG-4 Systems), on the basis of the foregoing VRML, data to describe the scene is reduced and a 3D scene similar to that mentioned above is described by using a BIFS (Binary Format for Scene Description) obtained by using a binary expression—table to convert the VRML. The binarized BIFS data is called a BIFS stream.

Although a detailed binarizing method is not mentioned here, in case of such a BIFS stream, different from a text such as a VRML, it is necessary to reconstruct a scene structure after once decoding the BIFS stream on the display side.

In case of using a texture, video/audio data, or the like, those bit streams are also simultaneously multiplexed and transmitted and received as a single bit stream.

FIG. 1 shows an example of a conventional receiving and displaying system of 3D data.

In the diagram, reference numeral 101 denotes a bit stream receiving unit for receiving a bit stream from a line.

Reference numeral 102 denotes a demultiplexer for extracting each bit stream from the single multiplexed bit stream.

Reference numeral 103 denotes a BIFS decoder (BIFS parser) for decoding scene information to be displayed and forming a scene tree of a 3D object. "Scene tree" denotes information showing layout information of the objects, a mutual dependency relationship, and the like. Reference numeral 104 denotes an image decoder and shows a portion for decoding compressed image code data such as a JPEG file or the like.

Reference numeral 105 denotes a video decoder for decoding code data of video, and 106 indicates an audio decoder for decoding code data of audio.

Reference numeral 107 denotes a scene tree memory for storing the scene tree formed by the BIFS decoder 103.

Reference numeral 108 denotes a renderer which finally arranges a 3D object and a texture and video/audio data which are associated with the 3D object into a 3D space and displays and reproduces them on the basis of the scene tree stored in the scene tree memory 107.

Reference numeral 109 denotes a final output device. For example, image information is displayed on a TV monitor and audio information is reproduced from a speaker.

The bit stream is separated, decoded, and rendered as mentioned above and 3D displayed.

FIG. 2 shows an example of such a kind of bit stream.

Reference numeral 201 denotes a header/info stream in which a header portion and multiplexed information of each stream are written. Reference numeral 202 denotes a BIFS stream in which scene information is described; 203 an image data stream to which texture data or the like is transmitted; and 204 to 209 video/audio streams in which a video stream and an audio stream are alternately multiplexed. In media such as video, audio, and the like which need a real-time reproduction and a synchronization, the video stream and the audio stream are often alternately multiplexed.

FIG. 3 shows an example of the scene tree formed by the BIFS decoder 103. However, various field data is omitted here.

It will be understood that an image texture is adhered to a 3D object box from the scene tree shown in FIG. 3, a movie texture is adhered to a 3D object cylinder, and further, an audio data is reproduced.

FIG. 4 shows a display example in the case where an image, video data, and audio data are rendered on the basis of the scene tree shown in FIG. 3.

It will be understood from FIG. 4 that a 3D object box 401 to which an image texture has been adhered and a 3D object cylinder 402 to which a movie texture has been adhered are displayed and, at the same time, an audio (audio sound or audio data) 403 is reproduced.

It will be obviously understood that not only the still image texture can be mapped but also an audio clip and a video clip can be mapped by the foregoing VRML as mentioned above.

In recent years, there is a tendency of adopting a technique to protect a copyright with respect to the display of such a 3D scene.

Specifically speaking, a method whereby a stream of copyright information is inserted into a bit stream, thereby protecting data such as texture image, video/audio data, or the like on a stream (media stream) unit basis is considered.

According to such a method, the copyright information is previously multiplexed into the bit stream. By using the method, the stream such as video/audio data is protected by the copyright information. Only in the case where the stream is authenticated by descrambling or collating it with a password or the like, the copyright protection is cancelled and the display and reproduction of video/audio data are started. Not only the video/audio streams but also a BIFS stream can be similarly protected as one media stream.

If such a method is used, however, since the 3D object is not defined as a stream, a problem such that the 3D object itself cannot be protected occurs.

It is now assumed as an example that a movie texture on the 3D object cylinder 402 and the audio 403 shown in FIG. 4 are protected.

In this case, after the rendering, as shown at reference numerals 405 and 404, while the movie texture on the 3D object cylinder 402 and the audio 403 are protected, they are not displayed and reproduced obviously. However, the shape of the 3D object cylinder 402 is displayed as it is in a gray color which has been set as a color of a default as shown in FIG. 5.

If the user wants to set such that the 3D object cylinder is not displayed, since the 3D object has been defined by the BIFS stream, the BIFS stream itself has to be protected.

In such a case, however, the 3D object box itself is not displayed in a manner similar to the 3D object cylinder at this time.

Therefore, one approach considered is to previously divide the BIFS stream into every 3D object and protect only the stream which defines the 3D object cylinder. However, it is not easy to divide the BIFS stream and each time the 3D object is moved, modified, extinguished, or newly appears, the BIFS stream corresponding thereto has to be updated or the like, so that a problem arises such that processes become complicated.

In the case of using the VRML, it is also a considered approach to form a VRML file corresponding to each 3D object and describe the whole 3D scene so as to individually recognize each of a plurality of 3D objects. In this case, however, a problem arises such that the VRML file has to be complicatedly formed.

SUMMARY OF THE INVENTION

In consideration of the above problems, it is an object of the invention to provide an image processing apparatus, method, and system and a storage medium, in which a copyright with respect to an arbitrary 3D object can be extremely simply and easily protected without performing a troublesome process such that a stream of BIFS is divided into a plurality of streams.

To accomplish the above object, according to a preferred embodiment of the invention, there is disclosed an image processing apparatus for displaying a three-dimensional scene, comprising identifying means for identifying a 3-dimensional object having copyright-protected information among 3-dimensional objects constructing the 3-dimensional scene, on the basis of data describing the 3-dimensional scene; and display inhibiting means for inhibiting a display of the 3-dimensional object identified by the identifying means until a predetermined authenticating process is finished. There are also disclosed an information processing method for such an information processing apparatus and a storage medium which stores a program to realize such an information processing method.

To accomplish the above object, according to another preferred embodiment of the invention, there is disclosed an image processing system comprising a transmitting apparatus and a receiving apparatus, wherein the transmitting apparatus includes transmitting means for transmitting scene data describing a 3-dimensional scene, media data associated with the scene data, and copyright-protected data, and the receiving apparatus includes receiving means for receiving the scene data describing the 3-dimensional scene, media data associated with the scene data, and copyright-protected data which were transmitted from the transmitting apparatus, separating means for separating all of the data received by the receiving means, access control means for controlling accesses to the scene data and the media data which were separated by the separating means on the basis of the copyright-protected data separated by the separating means, media decoding means for decoding the media data separated by the separating means, scene decoding means for forming copyright-protected scene data and copyright-unprotected scene data from the scene data separated by the separating means on the basis of the copyright-protected data separated by the separating means, and rendering means for rendering the 3-dimensional scene on the basis of the media data decoded by the media decoding means and the copyright-protected scene data and copyright-unprotected scene data formed by the scene decoding means.

The above and other objects and features of the present invention will become apparent from the following detailed description and the appended claims with reference to the accompanying drawings.

BRIEF DESCRIPTION OF THE DRAWINGS

FIG. 11 is a timing chart for a 3D reproducing process according to the second embodiment; and FIG. 12 is a diagram showing an example of a 3D description by a VRML according to the third embodiment.

DETAILED DESCRIPTION OF THE PREFERRED EMBODIMENTS

Figure 6:
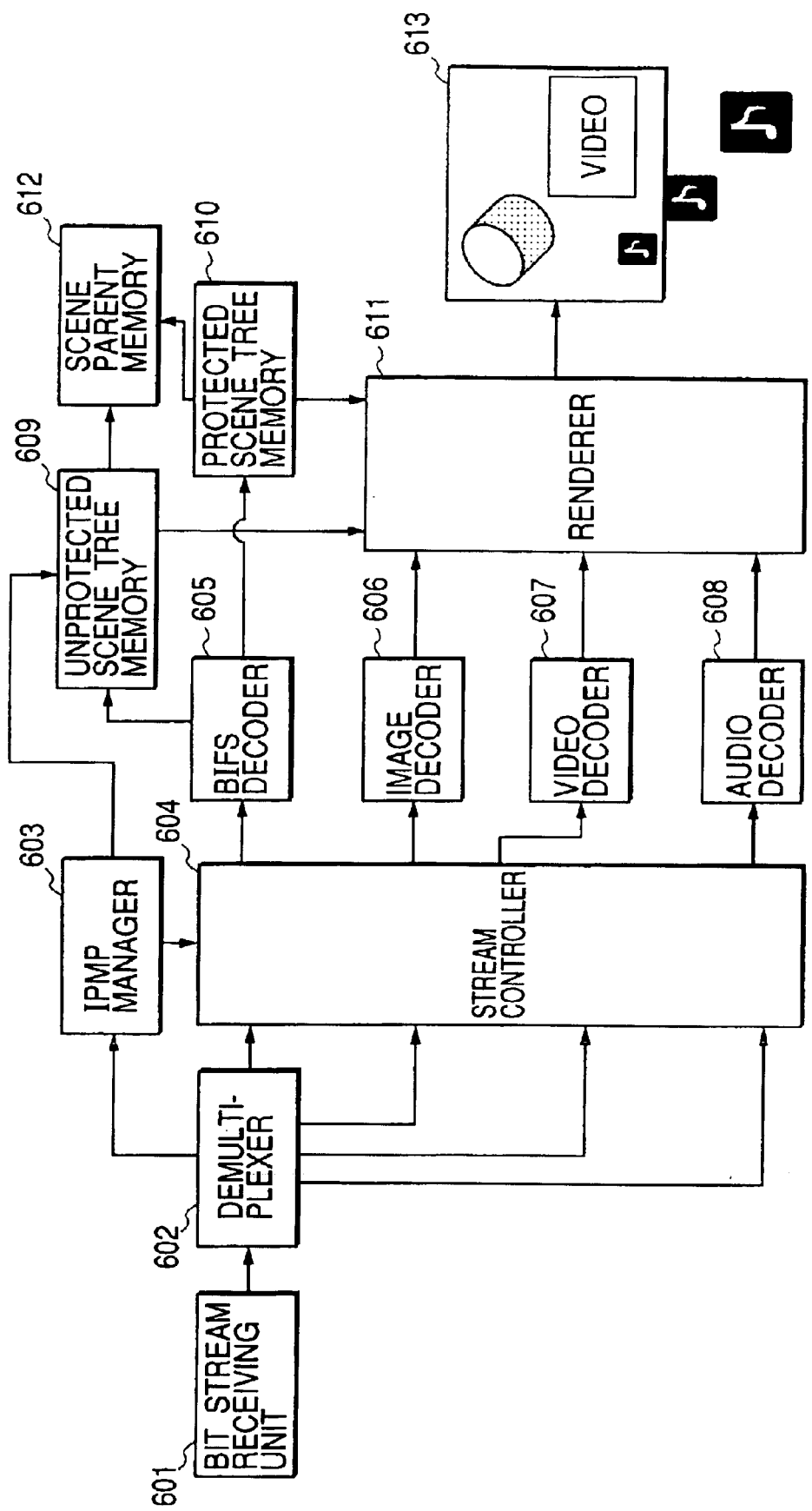
FIG. 6 is a constructional diagram of a 3D reproducing system according to the first embodiment.

FIG. 6 shows an example of a receiving and displaying system of 3D data according to the first embodiment of the invention.

In the diagram, reference numeral 601 denotes a bit stream receiving unit for receiving a bit stream from a line.

The bit stream receiving unit 601 is not always limited to a receiving unit in communication but can be a receiving unit for receiving a bit stream obtained by reading out data from a recording media or the like.

Reference numeral 602 denotes a demultiplexer for extracting each bit stream from a single multiplexed bit stream.

Reference numeral 603 denotes an IPMP (Intellectual Properly Management and Protection) manager for controlling an access control of a stream controller 604, which will be explained hereinlater, in accordance with copyright information extracted by the demultiplexer 602.

Reference numeral 604 denotes the stream controller for transmitting a media stream (stream such as image, video, audio, or the like) to subsequent media decoders such as BIFS decoder 605, image decoder 606, video decoder 607, audio decoder 608 only in the case where the authentication is normally performed by the IPMP manager 603.

When the media stream itself is protected by enciphering or the like, the stream controller 604 properly decodes an encryption by the control of the IPMP manager 603 and, thereafter, transmits a bit stream to the media decoder corresponding to each media stream.

Reference numeral 605 denotes the BIFS decoder (BIFS parser) for decoding scene information to be displayed, divide a scene into a protection node and an unprotection node (node in which the display can be performed as it is), and forms two scene trees of a protected scene tree and an unprotected scene tree.

Reference numeral 606 denotes the image decoder and shows a portion for decoding a compressed image code data such as a JPEG file.

Reference numeral 607 denotes the video decoder for decoding video code data, and 608 indicates the audio decoder for decoding audio code data.

Reference numeral 609 denotes an unprotected scene tree memory for storing the unprotected scene tree formed by the BIFS decoder 605, and 610 indicates a protected scene tree memory for storing the protected scene tree formed by the BIFS decoder 605.

Reference numeral 611 denotes a renderer for finally arranging a 3D object and a texture and video/audio data which are associated with the 3D object into a 3D space and displaying and reproducing them on the basis of the scene trees stored in the unprotected scene tree memory 609 and protected scene tree memory 610.

The data belonging to the unprotected scene tree is unconditionally rendered. The data belonging to the protected scene tree is rendered after the copyright information is cancelled and a tree structure is reconstructed.

Reference numeral 612 denotes a scene parent memory for storing scene parent information, which will be explained hereinlater.

Reference numeral 613 denotes a final output device. For example, an image is displayed on the TV monitor and an audio sound is reproduced from the speaker.

Figure 7:
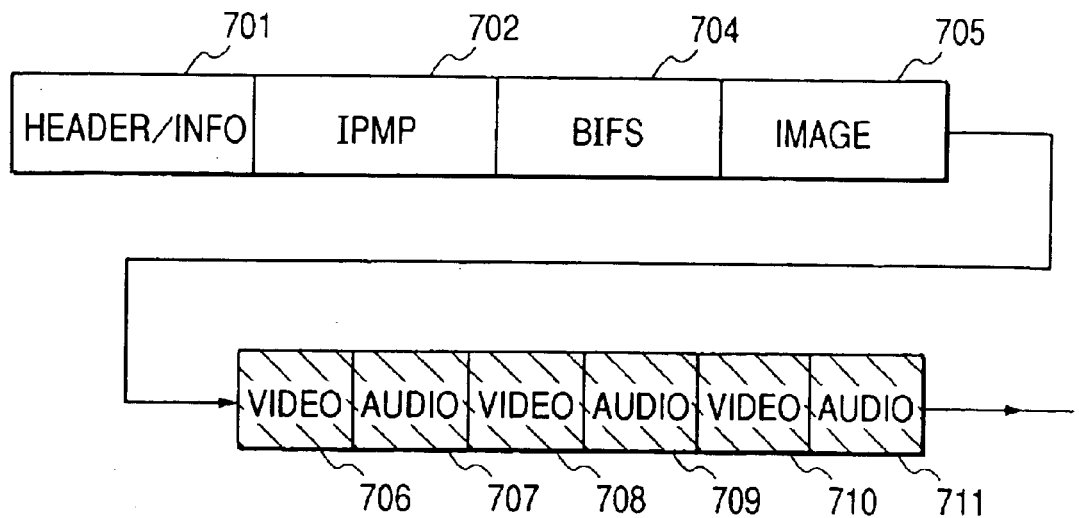
FIG. 7 is a diagram showing an example of a bit stream whose copyright has been protected.

FIG. 7 shows an example of a bit stream according to the first embodiment of the invention.

Reference numeral 701 denotes a header/info stream to which a header portion and multiplex information of each stream are written. Reference numeral 702 denotes an IPMP stream in which copyright information is described and 704 indicates a BIFS stream in which scene information is described.

Reference numeral 705 denotes an image data stream in which texture data or the like is transmitted.

Further, reference numerals 706 to 711 denote video/audio streams in which a video stream and an audio stream are alternately multiplexed.

Hatched portions of the video/audio streams 706 to 711 denote that they are protected by the copyright information of the IPMP stream 702.

That is, as for the video/audio streams 706 to 711, only when they are authenticated by descrambling, password collation, or the like, the copyright protection is cancelled and the display and reproduction of the video/audio data are started.

Figure 8:
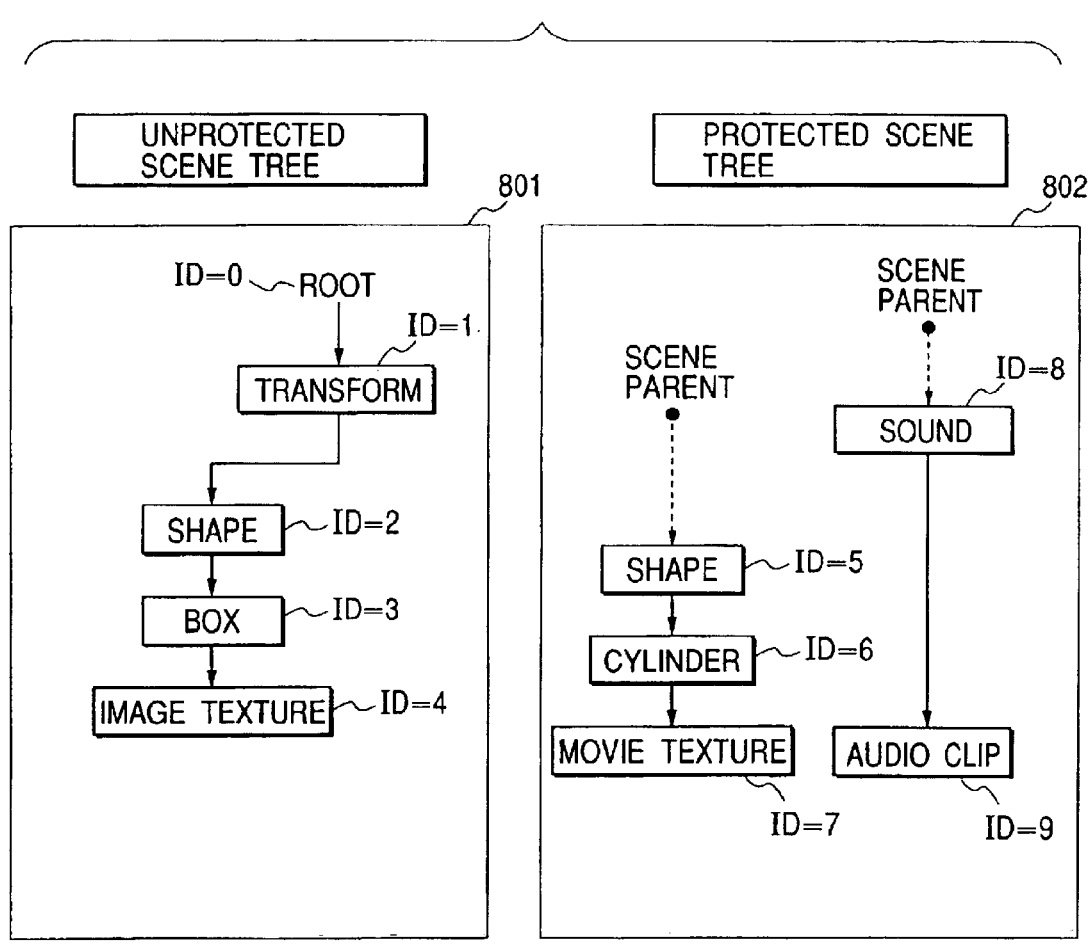
FIG. 8 is a diagram showing divided scene trees.

FIG. 8 shows examples of the unprotected scene tree and protected scene tree formed by the BIFS decoder 605.

Figure 1:
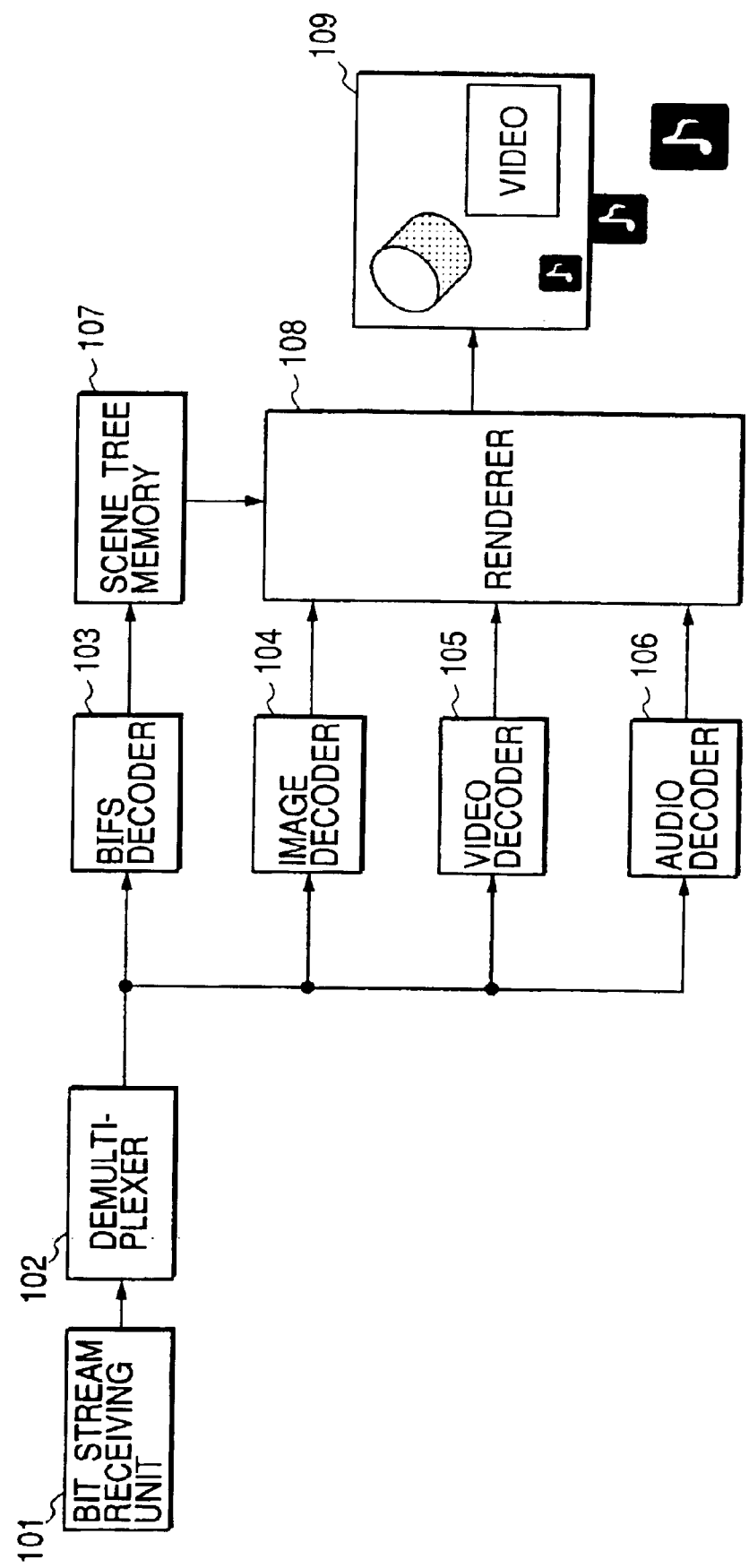
FIG. 1 is a constructional diagram of a 3D reproducing system.
Figure 2:
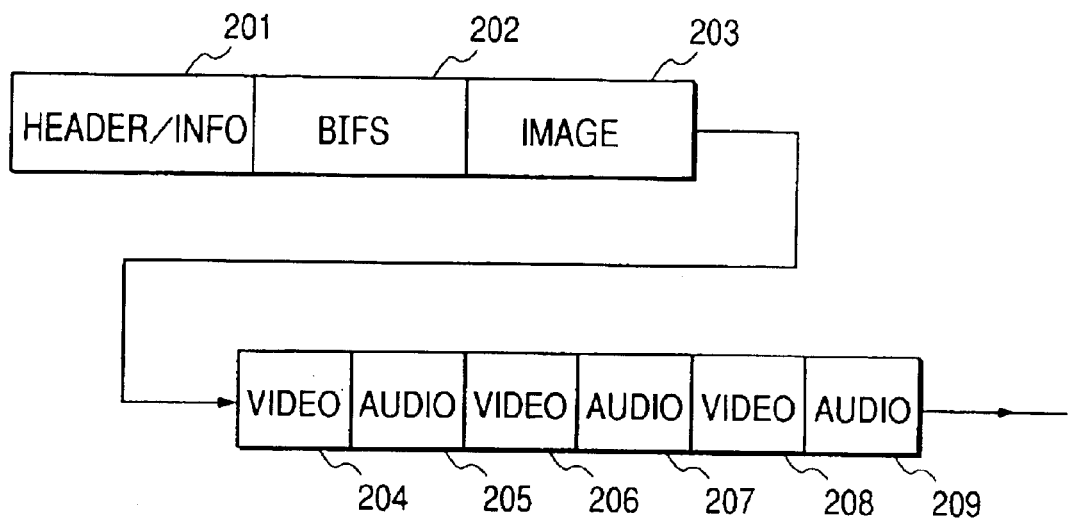
FIG. 2 shows an example of a construction of a bit stream which is processed in the 3D system of FIG. 1.
Figure 3:
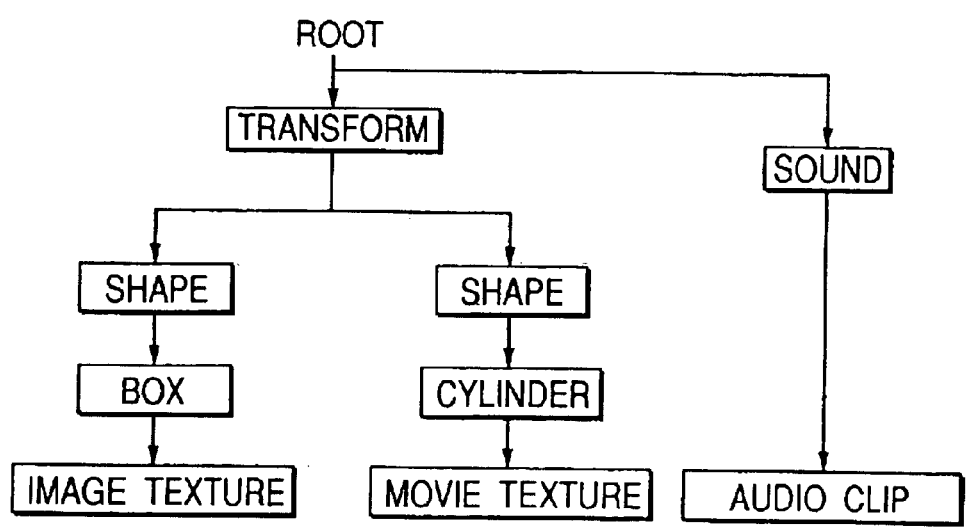
FIG. 3 is a diagram showing an example of a scene tree.
Figure 4:
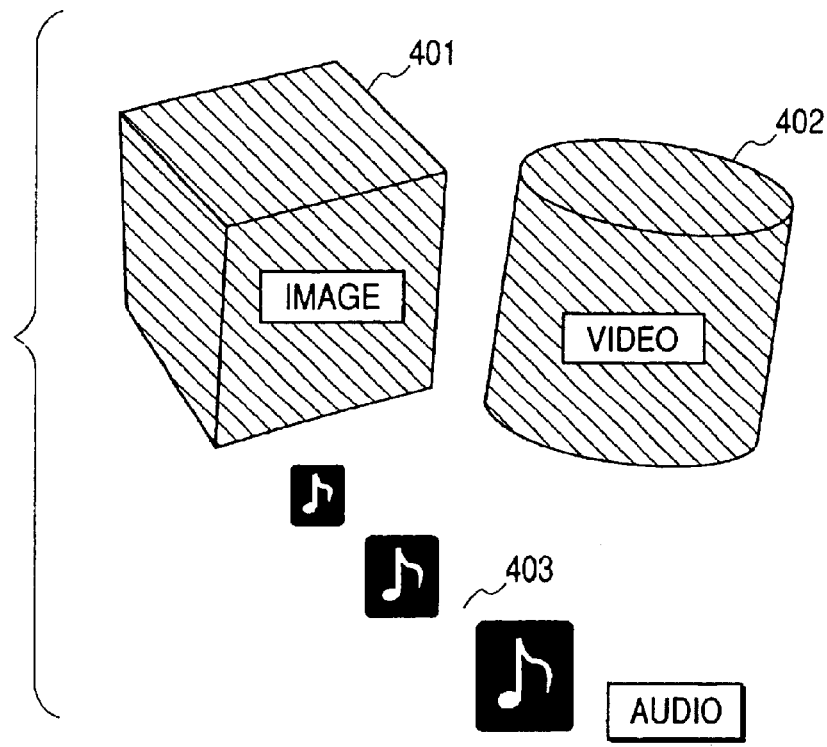
FIG. 4 is a diagram showing an example of a rendering result.
Figure 5:
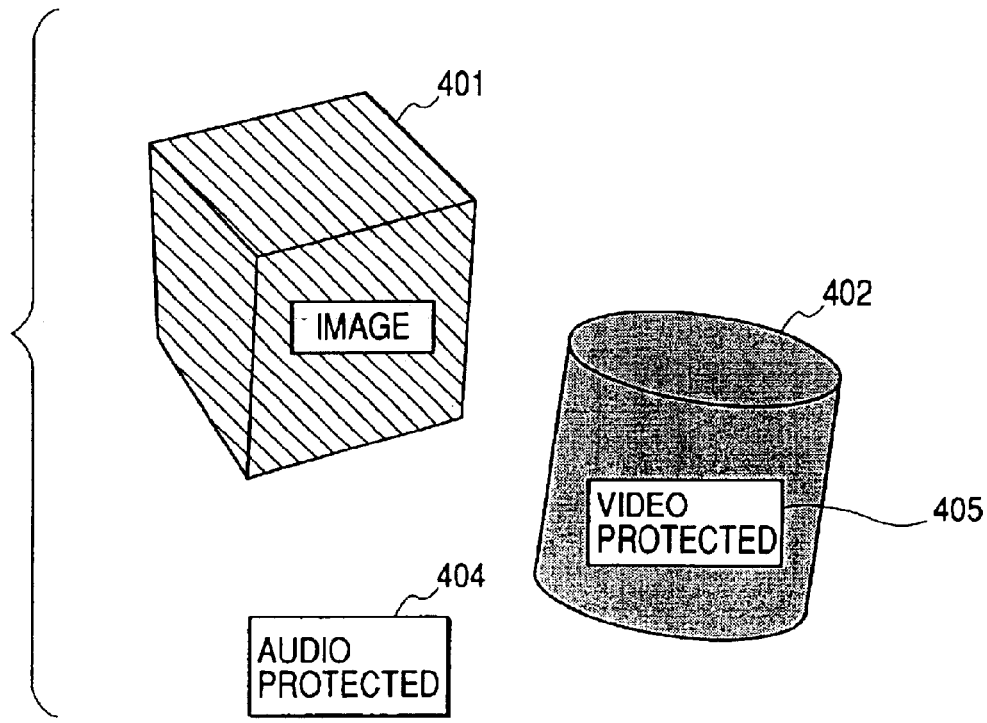
FIG. 5 is a diagram showing an example of a rendering result of a scene whose copyright has been protected.

Even in the first embodiment of the invention, it is assumed that the movie texture on the 3D object cylinder 402 and the audio 403 in FIG. 4 are protected by the copyright information.

In FIG. 8, therefore, a box node in which the image texture has been mapped is formed as an unprotected scene tree 801. On the contrary, a cylinder node in which the movie texture has been mapped and a node of audio mapped to the whole scene is formed as a protected scene tree 802.

Since node IDs (=1 to 9) are allocated to the nodes, respectively, and ROOT (root of the scene) which is defined by ID=0 is the unprotection node, even if the copyright protection is not cancelled, the scene can be constructed only by the unprotected scene tree 801.

Since the ROOT defined by ID=0 does not exist in the protected scene tree 802, a scene parent information showing to which position in the scene each node belonging to the protected scene tree 802 is connected is stored in the scene parent memory 612. Specifically speaking, the scene parent information which is stored in the scene parent memory 612 comprises a set of a node ID to be linked and an ID of its parent node.

In FIG. 8, a set of ID=5 and ID=1 and a set of ID=8 and ID=0 (ROOT) are stored in the scene parent memory 612. In this case, although only one child node is linked with respect to each parent node, a plurality of child nodes can obviously exist.

Although the details of an internal construction of the scene parent memory 612 are not described here, for example, a method such that a child node ID is written subsequently to the parent node ID and the node ID is terminated by a unique code which does not overlap to the ID number is considered.

Figure 9:
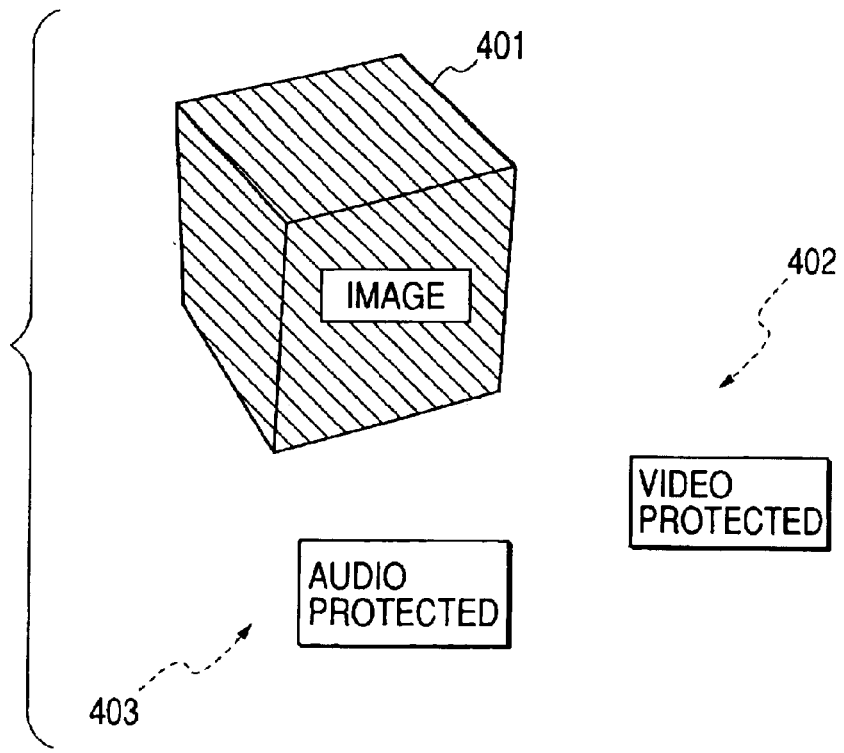
FIG. 9 is a diagram showing an example of a rendering result of a scene whose copyright has been protected according to the first embodiment.

When the copyright protection is not cancelled here, since the scene is constructed only by the unprotected scene tree 801, it is displayed as shown in FIG. 9.

As will be obviously understood from FIG. 9, while the movie texture on the 3D object cylinder 402 and the audio 403 are protected, they are not displayed nor reproduced and the shape of the 3D object cylinder 402 is not at all displayed as well.

When the copyright protection is cancelled, since the scene is constructed by both the unprotected scene tree 801 and protected scene tree 802, it is displayed as shown in FIG. 9.

Specifically speaking, when the scene is reconstructed, the scene parent information is read out from the scene parent memory 612 and a shape node defined by ID=5 is linked as a child node of a transform node defined by ID=1, thereby displaying the 3D object cylinder 402 having the movie texture. On the other hand, a sound node defined by ID=8 is linked as a child node of ROOT defined by ID=0, thereby reproducing the audio 403.

According to the first embodiment as described above, by forming the two scene trees of the protected scene tree and the unprotected scene tree on the basis of the protection node and the unprotection node included in the BIFS stream, the copyright protection of the 3D object and the media associated therewith can be easily performed.

Although the first embodiment can be realized by hardware, the whole system can be obviously realized by software.

Figure 10:
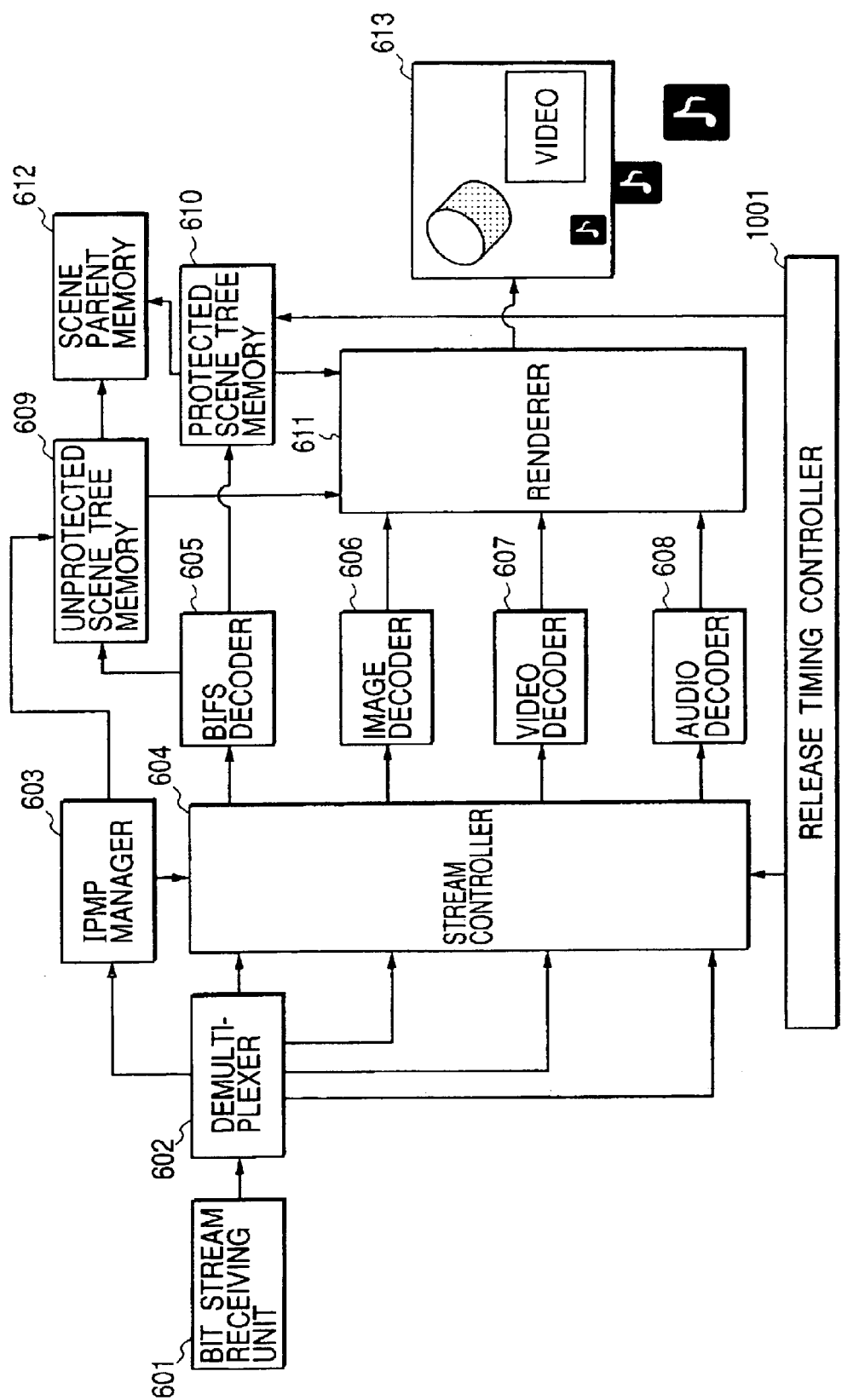
FIG. 10 is a constructional diagram of a 3D reproducing system according to the second embodiment.

FIG. 10 shows an example of a receiving/displaying system of 3D data according to the second embodiment.

In the second embodiment, besides the construction of the first embodiment shown in FIG. 6, a release timing controller 1001 is added.

A case where the movie texture is adhered to the 3D object cylinder and a copyright of the scene is protected in a manner similar to the first embodiment will now be presumed.

When the copyright protection is cancelled by obtaining the authentication, the display of the 3D object cylinder and the movie texture is started. In this case, however, if the decoding of the movie texture is started before the rendering of the 3D object cylinder is finished, the scene is not normally formed. Further, it is also necessary to synchronize the movie texture and the audio again.

In the second embodiment, therefore, the timing for rendering after the copyright protection is cancelled is adjusted by the release timing controller 1001.

FIG. 11 shows a control example of the release timing controller 1001.

In the second embodiment, it is assumed that a copyright is not protected at the start of the display and both the 3D object and the video/audio are normally reproduced until time t1 on the halfway. The protection of a copyright of the 3D object is started at time t1. Since the protection is cancelled at time t2, a period of time between time t1 and t2 corresponds to an IPMP operation time of the 3D object. Similarly, a period of time between time t3 and t4 corresponds to a time necessary for processes of IPMP of video.

In such a state, by setting a final undisplaying period of time to a period between time t1 and t4, the release timing controller 1001 performs a control so as not to cause an inconvenience in the synthesis of the scene.

FIG. 12 shows an example of description of a 3D scene in case of the third embodiment in which the technique realized in the system according to the first embodiment is applied to the VRML.

Explanation will now be made in detail hereinbelow while tracing the lines of the description of the 3D scene.

The description regarding points which are not concerned with the present invention is omitted although they are necessary to explain the VRML. The line number is written at the line end of each line.

The first line relates to a node to group the objects.

In the 2nd to 7th lines, parameters such as layout position, angle of rotation, and the like of the objects are set.

In the 8th and 9th lines, the kind of figure is defined. In this example, a box is arranged. A box node has parameters of lateral, vertical, and height as a field (showing attributes which are peculiar to the node). In this case, they are set to a value of "1".

In the 10th to 12th lines, a surface shape (texture) of a box is defined. In the 13th line, "Texture1.jpg" (JPEG file) is shown as a name of the file of image texture which is actually texture mapped.

In the 19th and subsequent lines, similarly, a cylinder is arranged at a position different from that of the box and "Texture2.mpg" (MPEG file) is mapped as a surface shape (texture). In this case, since the video is designated as a source of the texture, it is called a movie texture and a motion image is reproduced on the cylinder.

In the (24-1)th to (24-4)th lines, a new node "protect" is used. This node is a kind of group node (which is used when several nodes are handled in a lump) and has a url (Uniform Resource Locator) field. Although the cylinder node is linked to "IPMP1.dat", it shows a link of the cylinder node to the copyright information. This "protect" node is nothing but one description example and another expression can be also used.

In the (35-1)th and (35-2)th lines, the "protect" node is also used in a manner similar to the case mentioned above and the audio node is linked to "IPMP1.dat" here.

In the 36th to 39th lines, an audio source is defined and "Sound.mpg" (MPEG audio file) is simultaneously reproduced as a sample when the scene is displayed.

When the information processing apparatus reproduces the 3D scene on the basis of the VRML, the information processing apparatus executes the following processes.

That is, first, the VRML is read and the "protect" node is detected. Subsequently, when the "protect" node is detected, the rendering of the portion grouped by the "protect" node is temporarily stopped. When it is determined that the inhibition can be cancelled due to the authenticating process of a copyright, the rendering of the portion grouped by the "protect" node is performed.

When the protection of a copyright is not cancelled, since the rendering of the portion grouped by the "protect" node is inhibited, it is displayed as shown in FIG. 9. When the protection of a copyright is cancelled, since the rendering of the portion grouped by the "protect" node is also performed, it is displayed as shown in FIG. 4.

Although both the cylinder node and the audio node have the same copyright information in the third embodiment, the cylinder node and the audio node can also have different copyright information by allowing the cylinder node to link to "IPMP1.dat" and allowing the audio node to link to "IPMP2.dat".

According to the third embodiment as described above, by adding the protection node such as "protect" node to the VRML, the copyright protection of the 3D object and the media associated therewith can be easily performed.

As described above, a copyright of the 3D object and the texture and video/audio which are associated with the 3D object and the like can be integratedly and extremely easily controlled.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus for displaying a scene including a plurality of objects, comprising:

receiving means for receiving scene data comprised of a plurality of data streams which include at least a copyright data stream, a scene structure data stream, and a plurality of media data streams;

identifying means for identifying a media data stream in the received scene data to be protected by copyright information in the copyright data stream in the received scene data;

construction means for constructing the scene from the plurality of objects and the plurality of data streams by controlling a reproduction operation based on the scene structure data stream in accordance with the copyright information such that the constructed scene does not include the media data stream identified by said identifying means and an object related to the identified media data stream until a predetermined authenticating process is completed; and display control means for displaying the constructed scene constructed by said construction means on a display screen.

2. An apparatus according to claim 1, further comprising reproduction inhibiting means for inhibiting a reproduction of video/audio in the case where the object which is not included in the constructed scene constructed by said construction means is accompanied with video/audio data.

3. An apparatus according to claim 2, further comprising synchronizing means for, in the case where the object which is not included in the constructed scene constructed by said construction means is accompanied with the video/audio data, synchronizing the display of the object with the reproduction of said video/audio when the object becomes included in the constructed scene constructed by said construction means.

4. An image processing apparatus for displaying a scene including a plurality of objects, comprising:

receiving means for receiving scene data comprised of a plurality of data streams which include at least a copyright data stream, a scene structure data stream, and a plurality of media data streams;

identifying means for identifying a media data stream in the received scene data to be protected by copyright information in the copyright data stream in the received scene data;

classifying means for classifying an object including the data stream identified by said identifying means in a first group and classifying the other objects in a second group;

construction means for constructing the scene from the plurality of objects on the basis of the groups classified by said classifying means by controlling a reproduction operation based on the scene structure data stream in accordance with the copyright information such that the constructed scene does not include the media data stream to be protected by the copyright information that has not been authenticated; and display control means for displaying the constructed scene constructed by said construction means on a display screen.

5. An apparatus according to claim 4, wherein said classifying means further classifies the object including the media data stream identified by said identifying means and video/audio data associated with the object in the first group and classifies the other objects and video/audio data associated with the other objects in the second group.

6. An image processing apparatus comprising:

receiving means for receiving a plurality of data streams which include at least a copyright data stream, a 3-dimensional scene description data stream, and a plurality of media data streams;

separating means for separating the copyright data stream, the 3-dimensional scene description data stream, and the media data streams from all of the data received by said receiving means;

access control means for controlling accesses to the 3-dimensional scene description data stream and a media data stream separated by said separating means on the basis of copyright information in the copyright data stream separated by said separating means;

copyright management means for executing a predetermined authenticating process for the media data stream copyright-protected on the basis of the copyright information;

media decoding means for decoding the media data streams separated by said separating means and an authenticated media data stream authenticated by said copyright management means;

scene decoding means for forming a copyright-protected scene and a copyright-unprotected scene from the 3-dimensional scene description data stream separated by said separating means on the basis of the copyright information; and rendering means for constructing the 3-dimensional scene on the basis of the media data streams decoded by said media decoding means according to the copyright-protected scene and the copyright-unprotected scene formed by said scene decoding means and rendering the constructed 3-dimensional scene to display on a display screen.

7. An apparatus according to claim 6, wherein said copyright-protected scene describes a scene which is rendered after authentication by said copyright management means, and said copyright-unprotected scene data describes a scene which is rendered irrespective of the authentication.

8. An apparatus according to claim 6, further comprising instructing means for giving an instruction for an access timing in said access control means in order to adjust a timing for the rendering by said rendering means.

9. An image processing apparatus comprising:

receiving means for receiving scene data comprised of a plurality of data streams which include at least a copyright data stream, a scene structure data stream, and a plurality of media data streams;

identifying means for identifying a media data stream in the received scene data to be protected by copyright information in the copyright data stream in the received scene data;

detecting means for detecting an object not to be displayed on a basis of a language describing a 3-dimensional scene;

construction means for constructing the 3-dimensional scene from a plurality of objects and the plurality of data streams by controlling a reproduction operation based on the scene structure data stream in accordance with the copyright information and a detecting result of said detecting means such that the constructed 3-dimensional scene does not include the media data stream identified by said identifying means and the object detected by said detecting means until a predetermined authenticating process is completed; and display control means for displaying the constructed 3-dimensional scene constructed by said construction means on a display screen.

10. An apparatus according to claim 9, wherein said language is a VRML.

11. An image processing method of displaying a scene including a plurality of objects, comprising:

a receiving step of receiving scene data comprised of a plurality of data streams which include at least a copyright data stream, a scene structure data stream, and a plurality of media data streams;

an identifying step of identifying a media data stream in the received scene data to be protected by copyright information in the copyright data stream in the received scene data;

a construction step of constructing the scene from the plurality of objects and the plurality of data streams by controlling a reproduction operation based on the scene structure data stream in accordance with the copyright information such that the constructed scene does not include the media data stream identified in said identifying step and a object related to the identified media data stream until a predetermined authenticating process is completed; and a display control step of displaying the constructed scene constructed in said construction step on a display screen.

12. A method according to claim 11, further comprising a reproduction inhibiting step of inhibiting a reproduction of video/audio in the case where the object which is not included in the constructed scene constructed in said construction step is accompanied with video/audio data.

13. A method according to claim 12, further comprising a synchronizing step of, in the case where the object which is not included in the constructed scene constructed in said construction step is accompanied with the video/audio data, synchronizing the display of the object with the reproduction of the video/audio when the object becomes included in the constructed scene constructed in said construction step.

14. An image processing method of displaying a scene including a plurality of objects, comprising:

a receiving step of receiving scene data comprised of a plurality of data streams which include at least a copyright data stream, a scene structure data stream, and a plurality of media data streams;

an identifying step of identifying a media data stream in the received scene data to be protected by copyright information in the copyright data stream in the received scene data;

a classifying step of classifying an object including the media data stream identified in said identifying step in a first group and classifying the other objects in a second group;

a construction step of constructing the scene from the plurality of objects on the basis of the groups classified in said classifying step by controlling a reproduction operation based on the scene structure data stream in accordance with the copyright information such that the constructed scene does not include the media data stream to be protected by the copyright information that has not been authenticated; and a display control step of displaying the constructed scene constructed in said construction step on a display screen.

15. A method according to claim 14, wherein in said classifying step, the object including the media data stream identified in said identifying step and video/audio data associated with the object are classified in the first group, and the other objects and video/audio data associated with the other objects are classified in the second group.

16. An image processing method comprising:

a receiving step of receiving a plurality of data streams which include at least a copyright data stream, a 3-dimensional scene description data stream, and a plurality of media data streams;

a separating step of separating the copyright data stream, the 3-dimensional scene description data stream, and the media data streams from all of the data received in said receiving step;

an access control step of controlling accesses to the 3-dimensional scene description data stream and a media data stream separated in said separating step on the basis of copyright information in the copyright data stream separated in said separating step;

a copyright management step of executing a predetermined authenticating process for the media data stream copyright-protected on the basis of the copyright information;

a media decoding step of decoding the media data stream separated in said separating step and authenticated in said copyright management step;

a scene decoding step of forming a copyright-protected scene and a copyright-unprotected scene from the 3-dimensional scene description data stream separated in said separating step on the basis of the copyright information; and a rendering step of constructing the 3-dimensional scene on the basis of the media data stream decoded in said media decoding step according to the copyright-protected scene and the copyright-unprotected scene formed in said scene decoding step and rendering the constructed 3-dimensional scene to display on a display screen.

17. A method according to claim 16, wherein said copyright-protected scene data describes a scene which is rendered after authentication in said copyright management step, and said copyright-unprotected scene data describes a scene which is rendered irrespective of the authentication.

18. A method according to claim 16, further comprising an instructing step of giving an instruction for an access timing in said access control step in order to adjust a timing for the rendering in said rendering step.

19. An image processing method comprising:

a receiving step of receiving scene data comprised of a plurality of data streams which include at least a copyright data stream, a scene structure data stream, and a plurality of media data streams;

an identifying step of identifying a media data stream in the received scene data to be protected by copyright information in the copyright data stream in the received scene data;

a detecting step of detecting an object not to be displayed on a basis of a language describing a 3-dimensional scene;

a construction step of constructing the 3-dimensional scene from a plurality of objects and the plurality of data streams by controlling a reproduction operation based on the scene structure data stream in accordance with the copyright information and a detecting result in said detecting step such that the constructed 3-dimensional scene does not include the media data stream identified in said identifying step and the object detected in said detecting step until a predetermined authenticating process is completed; and a display control step of displaying the constructed 3-dimensional scene constructed in said construction step on a display screen.

20. A method according to claim 19, wherein said language is a VRML.

21. An image processing system comprising a transmitting apparatus and a receiving apparatus, wherein (A) said transmitting apparatus includes transmitting means for transmitting a plurality of data streams which include at least a copyright data stream, a 3-dimensional scene description data stream, and a plurality of media data streams, and (B) said receiving apparatus includes:

receiving means for receiving the plurality of data streams which were transmitted from said transmitting apparatus;

separating means for separating the copyright data stream, the 3-dimensional scene description data stream, and the media data streams from all of the data received by said receiving means;

access control means for controlling accesses to the 3-dimensional scene description data stream and a media data stream separated by said separating means on the basis of copyright information in the copyright data stream separated by said separating means;

copyright management means for executing a predetermined authenticating process for the media data stream copyright-protected on the basis of the copyright information;

media decoding means for decoding the media data streams separated by said separating means and an authenticated media data stream authenticated by said copyright management means;

scene decoding means for forming a copyright-protected scene and a copyright-unprotected scene from the 3-dimensional scene description data stream separated by said separating means on the basis of the copyright information; and rendering means for constructing the 3-dimensional scene on the basis of the media data stream decoded by said media decoding means according to the copyright-protected scene and the copyright-unprotected scene formed by said scene decoding means and rendering the constructed 3-dimensional scene to display on a display screen.

22. A storage medium which stores a computer program, said computer program comprising:
- a receiving module for receiving scene data comprised of a plurality of data streams which include at least a copyright data stream, a scene structure data stream, and a plurality of media data streams;
- an identifying module for identifying a media data stream in the received scene data to be protected by copyright information in the copyright data stream in the received scene data;
- a construction module for constructing the scene from the plurality of objects and the plurality of data streams by controlling a reproduction operation based on the scene structure data stream in accordance with the copyright information such that the constructed scene does not include the media data steam identified by said identifying module and an object related to the identified media data stream until a predetermined authenticating process is completed; and
- a display control module for displaying the constructed scene constructed by said construction module on a display screen.

* * * * *

UNITED STATES PATENT AND TRADEMARK OFFICE
CERTIFICATE OF CORRECTION

PATENT NO. : 6,895,555 B1
DATED : May 17, 2005
INVENTOR(S) : Tsutomu Ando

It is certified that error appears in the above-identified patent and that said Letters Patent is hereby corrected as shown below:

Title page,
Item [*] Notice, should read:
--      This patent issued on a continued prosecution application field under 37 CFR 1.53(d), and is subject to the twenty year patent term provisions of 35 U.S.C. 154(a)(2). --.

Signed and Sealed this

Seventh Day of February, 2006

JON W. DUDAS
*Director of the United States Patent and Trademark Office*